United States Patent [19]

Snowden et al.

[11] 4,444,063
[45] Apr. 24, 1984

[54] TORQUE MEASURING SYSTEMS

[75] Inventors: David C. Snowden, Near Abridge; Joseph J. Osborne, Enfield; David E. Thomas, Enfield; David W. Simms, Bishops Stortford, all of England

[73] Assignee: Sangamo Weston Limited, Enfield, England

[21] Appl. No.: 296,043

[22] Filed: Aug. 25, 1981

[30] Foreign Application Priority Data

Aug. 27, 1980 [GB] United Kingdom ............ 8027722

[51] Int. Cl.³ .................................. G01L 3/10
[52] U.S. Cl. .......................... 73/862.34; 364/506
[58] Field of Search ................. 73/862.33, 862.34; 364/508, 506

[56] References Cited

U.S. PATENT DOCUMENTS

| | | | |
|---|---|---|---|
| 3,548,649 | 12/1970 | Parkinson | 73/862.34 |
| 3,888,116 | 6/1975 | Spinella | 73/862.33 |
| 4,020,685 | 5/1977 | Van Millinger et al. | 73/862.34 |
| 4,310,795 | 1/1982 | Fremerey | 324/85 D |

FOREIGN PATENT DOCUMENTS 1281821 7/1972 United Kingdom .
1465734 3/1977 United Kingdom .
2048494 4/1979 United Kingdom .

Primary Examiner—Charles A. Ruehl
Attorney, Agent, or Firm—Dale Gaudier

[57] ABSTRACT

A microprocessor-based torque measuring system for a twin engine-aircraft gas turbine engine installation comprises respective inductive sensors 12,14, one for each engine. The sensors are positioned to co-operate with respective pairs of toothed wheels, which are secured to axially spaced points on the engine shaft whose torque is to be sensed and have interlaced teeth whose spacing circumferentially of the wheels varies with torque. Each sensor produces a torque signal which, after suitable shaping, has a mark-space ratio representative of torque, and the respective durations of the mark and space periods of the signal are measured digitally by counting clock pulses during successive groups of mark periods and space periods. The accumulated counts are then subjected to recursive digital filtering by the microprocessor, in accordance with a predetermined function approximating the response of a second order Butterworth filter. The microprocessor then calculates the torque for each engine, using the appropriate filtered counts together with digital signals respectively representative of the temperature, stiffness and zero-torque twist of the respective shaft.

10 Claims, 11 Drawing Figures

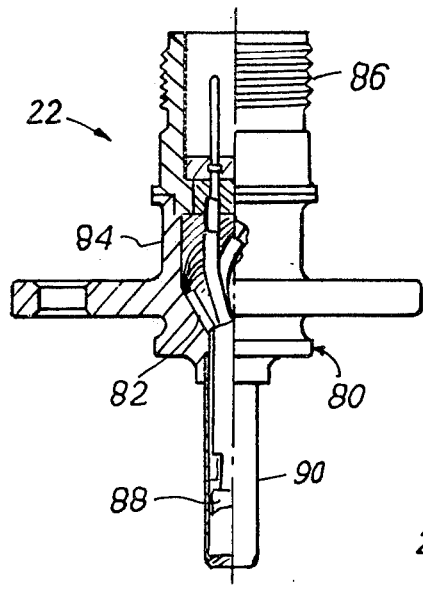
FIG. 6
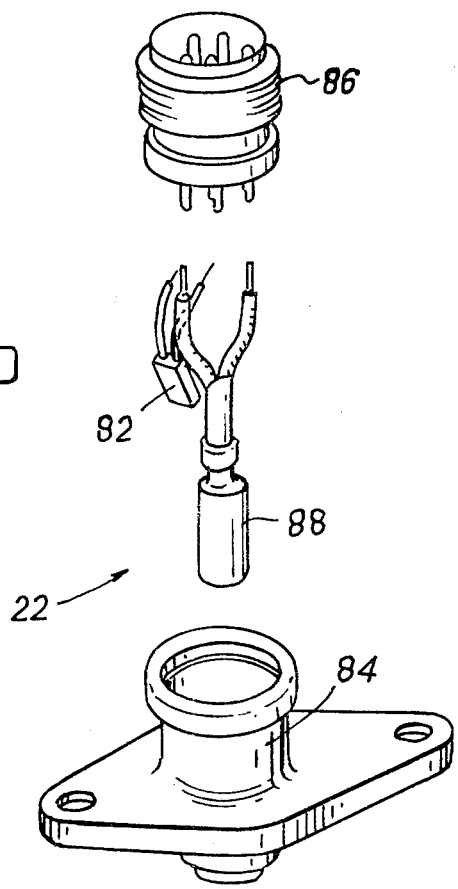
FIG. 7
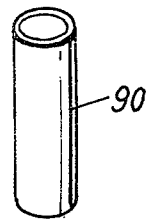

TORQUE MEASURING SYSTEMS

This invention relates to torque measuring systems, and is more particularly but not exclusively concerned with a torque measuring system for use with an aircraft gas turbine engine installation comprising two engines.

One known form of torque measuring system, described for example in our published U.K. Patent Application No. 2 050 623 A, comprises a pair of similar toothed wheels of magnetic material, which are secured to a shaft whose torque is to be measured at axially spaced points thereon. The wheels are disposed adjacent to each other, by connecting one of them to the shaft via a tube coaxially surrounding the shaft, and the teeth on one wheel are arranged to be interlaced between the teeth on the other. Variations in the torque applied to the shaft vary its twist between the respective points at which the toothed wheels are secured, and thus vary the spacing between adjacent pairs of the interlaced teeth. These variations in tooth spacing are detected by an inductive sensor, which senses the passage of the teeth therepast. The sensor thus produces an output signal which, after suitable shaping, takes the form of a periodic pulse signal whose mark-space ratio is a function of the torque to be measured.

In this known system, the shaped output signal is processed in an analogue torque measuring circuit, which produces an analogue output signal representative of the torque applied to the shaft. However, such analogue circuits are of limited accuracy and resolution, and are adversely affected by the electrical noise normally encountered in the somewhat harsh environment of a gas turbine engine installation. Further, at least one such circuit normally has to be provided for each engine in a multi-engine installation. It is therefore an object of the present invention to alleviate these drawbacks of the known system by providing a torque measuring system employing digital signal processing techniques.

According to one aspect of the invention, there is provided a torque measuring system comprising:

sensor means adapted to be mounted adjacent to a shaft whose torque is to be measured, the sensor means being arranged to produce a mark-space output signal whose mark-space ratio is a function of said torque;

a source of clock pulses;

counter means arranged to count said clock pulses during groups of M successive ones of at least one of the mark periods or the space periods of said output signal; and microprocessor means arranged to repeatedly combine a plurality of the most recent of the counts accumulated by the counter means in accordance with a predetermined function selected to implement a digital filter which increases the resolution of the time measurements represented by the counts while enhancing noise rejection, said microprocessor means being further arranged to calculate said torque from each such combination.

According to another aspect of the invention, there is provided a device for providing a selectable multi-bit digital electrical signal to a digital electronic circuit, the device comprising:

an insulating support having an input pin for receiving an input signal of predetermined logic level, and a plurality of output pins for applying said digital signal to said electronic circuit; and a relatively thin printed circuit mounted on a surface of said support, said printed circuit including a common track electrically connected to said input pin and a plurality of individual tracks each extending from said common track to a respective connection point electrically connected to a respective one of said output pins, the support being shaped beneath each of said individual tracks to facilitate severing of the respective track, whereby said input pin may be connected to any selected combination of said output pins to produce said digital signal.

The invention will now be described, by way of example only, with reference to the accompanying drawings, of which:

FIGS. 6 and 7 are sectional and exploded views respectively of a temperature sensor forming part of the system of FIG. 1;

Figure 1:
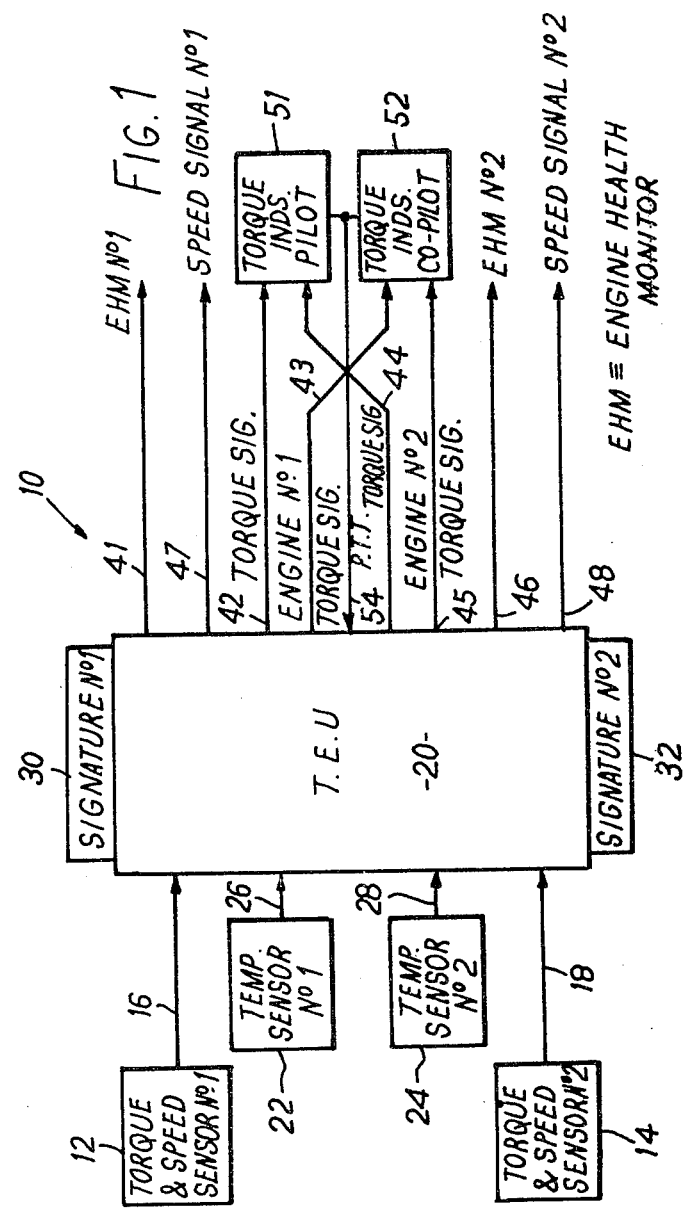
FIG. 1 is a simplified block circuit diagram of a torque measuring system in accordance with one aspect of the present invention.

The torque measuring system illustrated in FIG. 1 is indicated generally by reference 10, and is intended for use in a twin-engine aircraft gas turbine engine installations, to measure the torque applied to a respective shaft of each engine. The system operates in conjunction with pairs of toothed wheels, one pair for each shaft, the two wheels of each pair being secured to axially spaced points on their respective shaft (one via a torque tube) and having axially extending interlaced teeth. The spacing of adjacent interlaced teeth, measured circumferentially of the shaft, varies with the torque applied to the shaft. The teeth, of which there are eight on each wheel, can be axially extending as described hereinafter, or can take the form described in our aforementioned U.K. Patent Application No. 2 050 623 A.

The system 10 comprises first and second identical torque and speed sensors 12 and 14, one for each shaft. The sensors 12, 14, which will be described in more detail hereinafter, are each disposed adjacent the pair of toothed wheels associated with their respective shaft, so as to sense the passage of the interlaced teeth therepast, and their respective output signals are applied to inputs 16, 18 respectively of a torquemeter electronic unit (T.E.U.) 20. The system 10 further comprises first and second identical semiconductor type shaft temperature sensors 22, 24, again one for each shaft. The sensors 22, 24, which will also be described in more detail hereinafter, are immersed in the oil supplied to their respective shaft, and they produce respective output signals which vary substantially linearly with the temperature of their respective shaft and which are applied to inputs 26, 28 respectively of the electronic unit 20.

The electronic unit 20, which will be described in more detail hereinafter, has two identical signature input devices 30, 32, again one for each shaft, and eight outputs 41 to 48 respectively. Output signals representative of the torque applied to one of the two shafts appear at outputs 41 to 43, and two of these are used to drive one indicator in each of two dual torque indicators 51 and 52, provided for the aircraft pilot and co.pilot respectively: the third is applied to an engine health monitor (E.H.M.) for the first engine (not shown). Similarly, output signals representative of the torque applied to the other shaft appear at outputs 44 to 46, and are applied to the other indicator in each of the dual indicators 51 and 52 and to an engine health monitor for the second engine (not shown). Finally, output signals representative of the rotational speed of each shaft appear at outputs 47 and 48.

The dual indicators 51 and 52 both incorporate a "press-to-test" (PTT) facility, which applies a test command signal to a further input 54 of the electronic unit 20.

Figure 2:
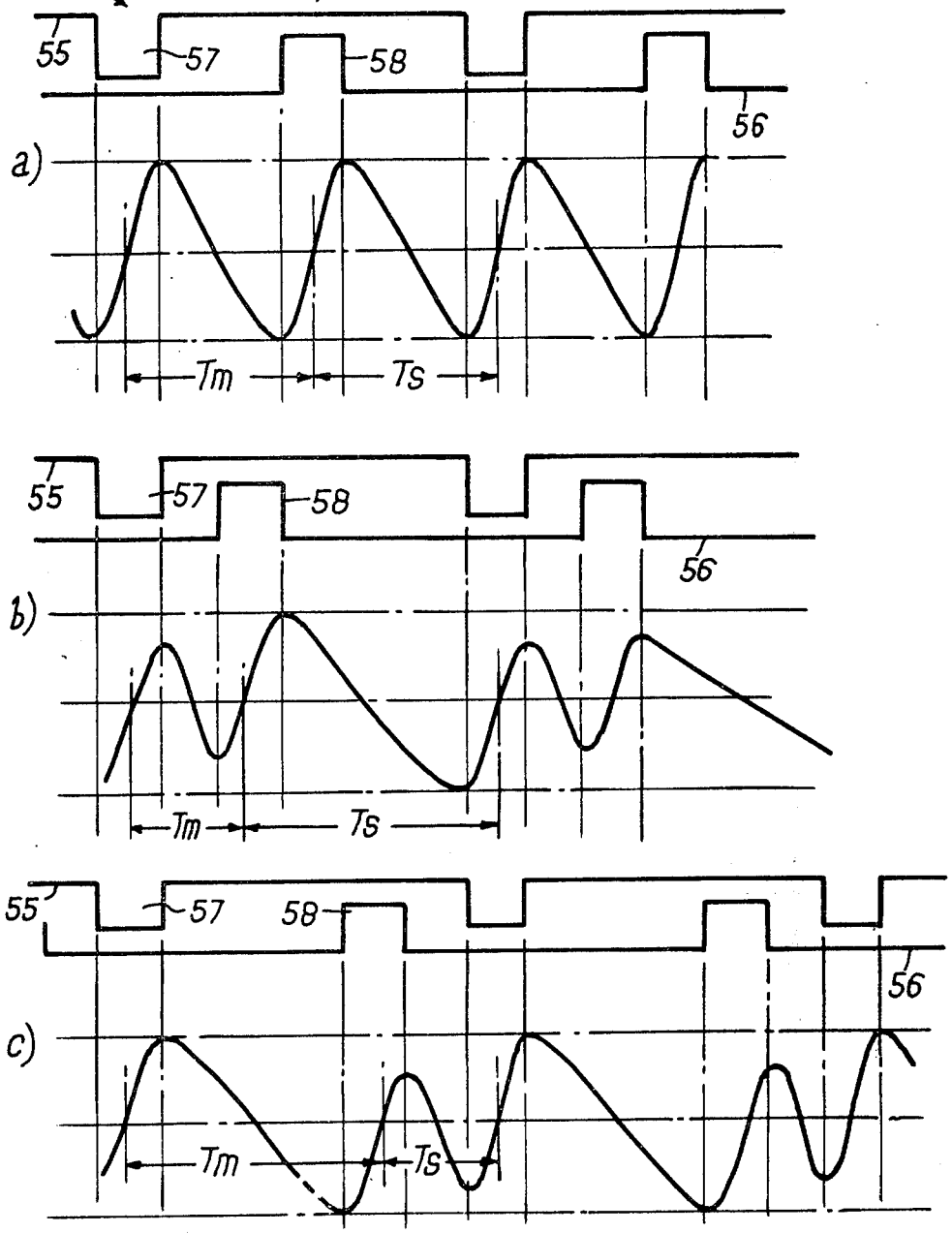
FIG. 2 shows three developed views of the axially interlaced teeth of two toothed wheels secured to axially spaced points on a shaft for which the torque is being sensed by the system of FIG. 1, with the wheels in three different relative angular positions, and also shows graphically the corresponding waveforms produced by an inductive sensor forming part of the system as the teeth move therepast.

The toothed wheels are indicated at 55 and 56 in the developed view of FIG. 2, in which it can be seen that their teeth 57 and 58 project axially and are interlaced, so that their passage can be sensed by a single one of the sensors 12 and 14. The waveform generated by such a probe is time-related to the relative positions of the teeth on the two-wheel combination, and frequency-related to its speed of rotation.

FIG. 2 illustrates typical waveforms that result for three different relationships of the toothed wheels:

$$\frac{Tm}{Ts} = 1; \frac{Tm}{Ts} 1; \text{ and } \frac{Tm}{Ts} 1$$

The behaviour of the toothed wheels on the shaft is affected by the actual shaft temperature, so as already mentioned, this temperature is monitored for each shaft by the temperature sensors 22, 24. The resulting temperature signals are fed to the electronic unit 20, which uses them to make an appropriate modification to its output data.

The function of the electronic unit 20 is to measure the time-interval relationship for each shaft as will hereinafter be described, and to convert the measurements into d.c. analogue outputs, proportional to the respective twists in the shafts and of suitable levels to drive the indicators 51, 52 and the aforementioned engine health monitor.

The electronic unit 20 provides other features as follows:

a. a square-wave output of 1:1 mark-space ratio and constant amplitude directly related to input frequency from each of the sensors 12, 14; and b. built-in self test circuitry, which when externally activated checks correct functioning of the system from the input terminals of the unit 20 onwards, and causes the pointers of the indicators 51, 52 to move to a suitable up-scale position, if the system is operational.

Figure 3:
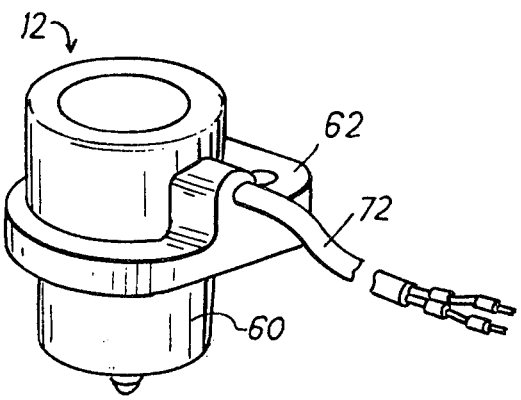
FIGS. 3 to 5 are isometric, sectional and exploded views respectively of the aforementioned inductive sensor.
Figure 4:
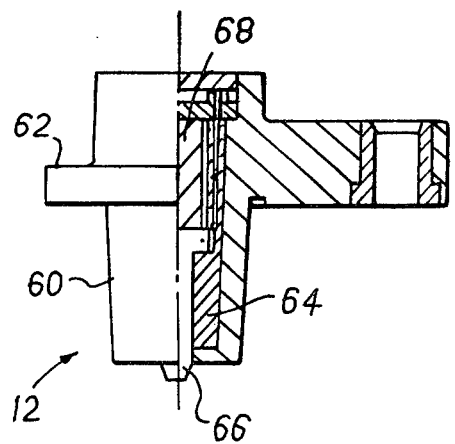
Figure 5:
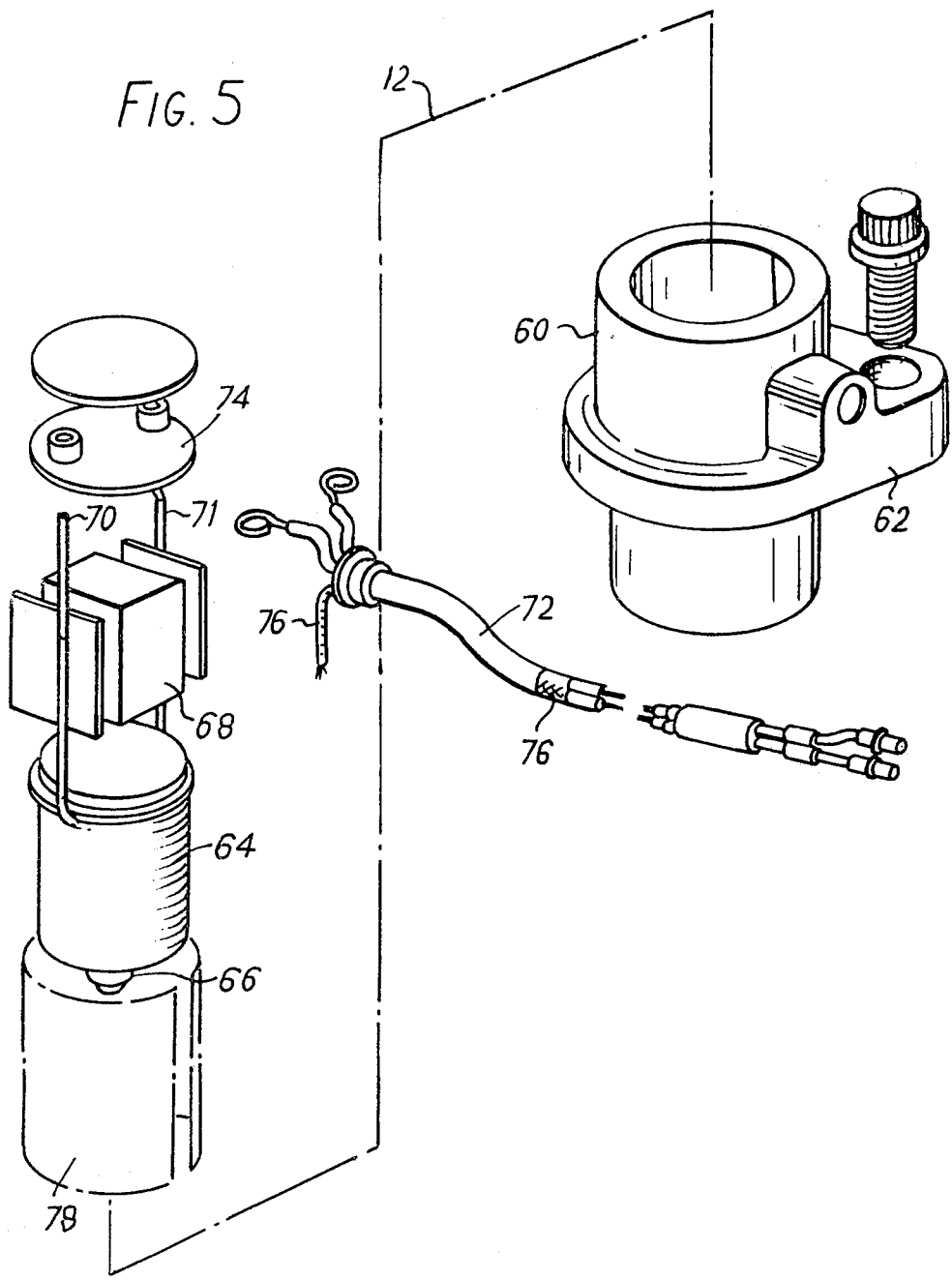

FIGS. 3 to 5 show the sensor 12 in greater detail, and it can be seen that the sensor comprises a glass filled polyimide (KINEL) moulded housing 60 which provides a mounting flange 62 for single point fixing to the engine. The housing 60 is designed to position and support the other components which are subsequently potted within it.

Enamel copper wire (temperature index 180° C.) to B.S. 4665: 1971 is used to wind a coil 64 onto a central pole 66 which has been insulated using polyimide tape and mica washers (not shown). Epoxy resin applied to the tip of the pole 66 and the coil 64 forms a seal between the housing 60 and the pole 66.

A Hycomax TM II magnet 68 is positioned on the base of the pole 66: such a magnet is ideally suited to the high reluctance magnetic circuit associated with this type of sensor and is capable of maintaining a high flux level in the magnetic circuit over the required temperature range.

The ends 70, 71 of the coil are brought out to the rear of the magnet 68 via appropriate cavities and insulators and soldered (with high temperature soft solder) to P.T.F.E. covered leadout cables 72 via eyelet terminations on a terminal disc 74.

The components are then vacuum encapsulated into the housing 60 using epoxy resin. The resin is filled with silica and mica flour to provide improved strength and reduce the expansion coefficient.

The leadout cables 72 have a screen 76 which is terminated within the probe and, as it is within the encapsulated volume, assists in cable retention.

Space is allowed in the assembly for the accommodation of a 0.002" thick copper shield 78, to screen the coil from R.F. interference should this be required.

FIGS. 6 and 7 show the shaft temperature sensor 22, which is incorporated in an engine oil temperature probe 80 based on a platinum resistance thermometer.

The shaft temperature sensor 22 comprises a high impedance semiconductor device 82, which possesses a substantially linear output current versus temperature characteristic.

The construction of the probe 80 is based on a stainless steel cast and machined body 84, containing a condenser 86 and a platinum resistance element 88. The element 88 is housed in a tube 90 which has been vacuum brazed into the cast body 84.

The semiconductor device 82 is bonded to the internal wall of the body 84 using a thermally conductive silicone compound, both to aid thermal response and to prevent vibration causing mechinical rupture of connection wires or separation of the semiconductor device from the body.

Figure 8:
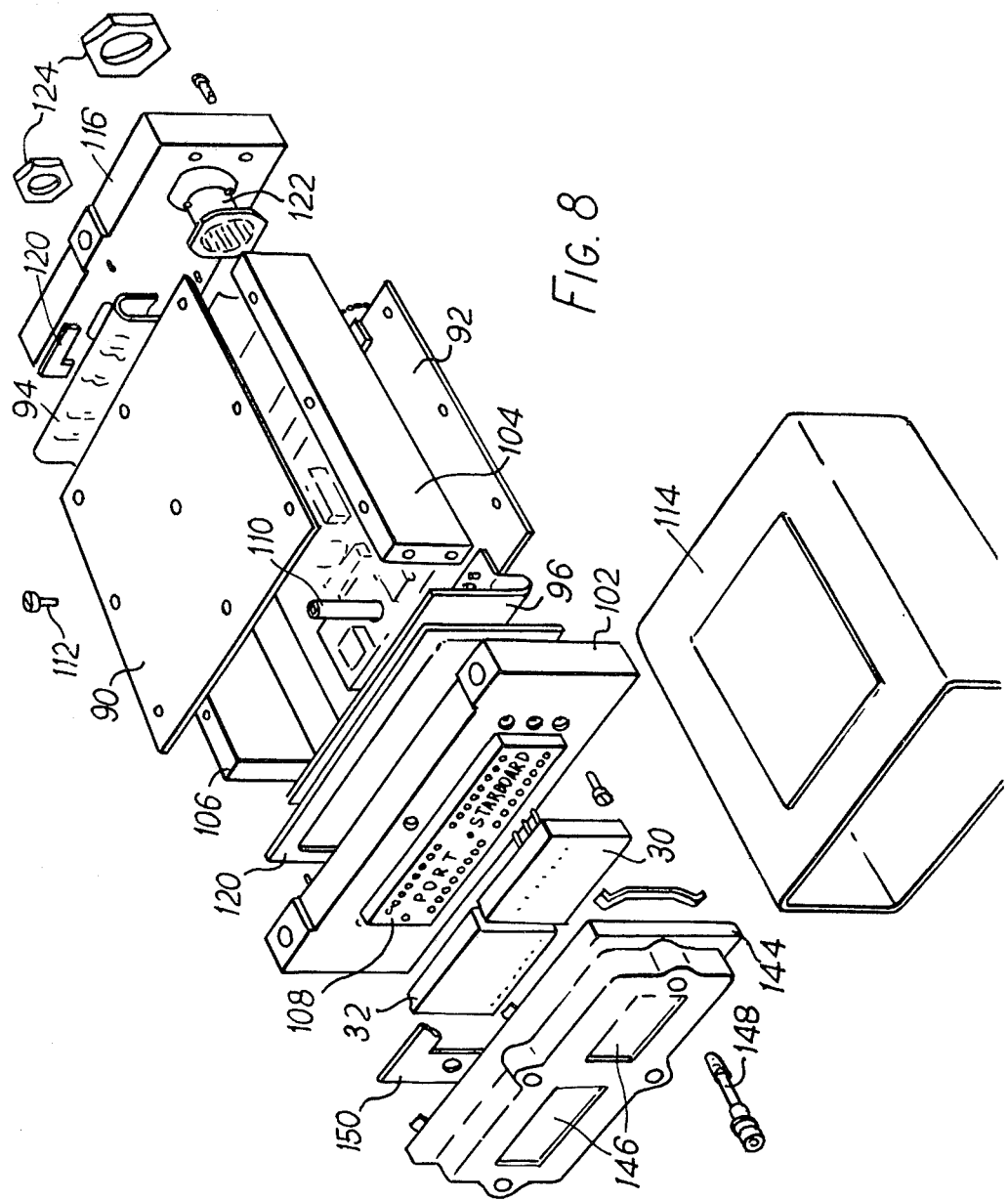
FIG. 8 is an exploded view of the torquemeter electronic unit of the system of FIG. 1.

The mechanical construction of the electronic unit 20 is shown in FIG. 8, from which it can be seen that two individually encapsulated printed circuit boards 90, 92 are interconnected with flexible printed circuits 94, 96. They are initially assembled on a flat surface, with the input/output connectors connected to the printed circuitry.

The rigid support for the printed circuit assembly is manufactured as a sub-assembly consisting of an aluminium end-plate 102 with substantial extruded aluminium runners 104, 106 and a moulded signature socket 108 secured to it. The printed circuit assembly is attached to this sub-assembly in the manner shown. Intermediate spacers and screws such as those indicated at 110, 112 are provided in appropriate positions to maintain the rigidity of the assembly.

An outer aluminium cover 114 is placed over the completed printed circuit assembly, and an end-plate 116 is secured with screws such as 118 to the ends of the extruded runners 104, 106.

The dimensions are selected so that R.F.I. gaskets 120, which are positioned at each end of the cover 114, are compressed, allowing the end-plate 116 to seat solidly on the ends of the runners 104, 106.

The aforementioned input/output connectors, one of which is indicated at 122 and which have been connected to the flexible P.C.B. as explained earlier, are drawn up to the end-plate 116 by their fixing nuts 124, which are then tightened. Each connector 122 is sealed to the material of the end-plate gaskets 120.

The end-plates 116 incorporate integral mounting points allowing three-point fixing to a flat surface using M5 size bolts.

Figure 9:
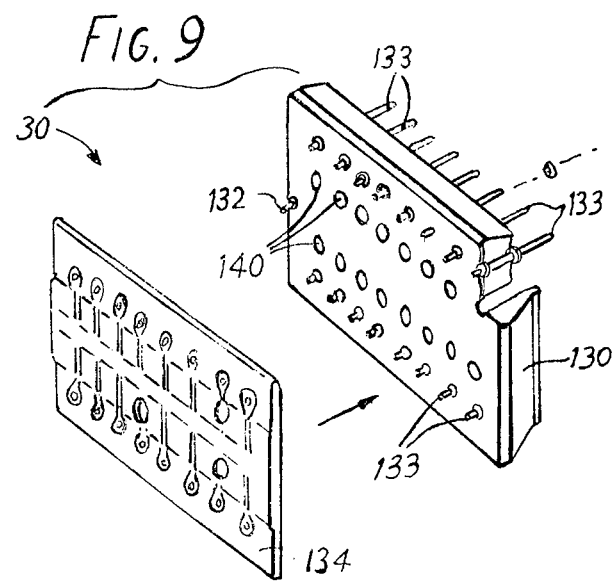
FIGS. 9 and 10 show different aspects of a "signature plug" which forms part of the system of FIG. 1, and which is in accordance with another aspect of the invention.
Figure 10:
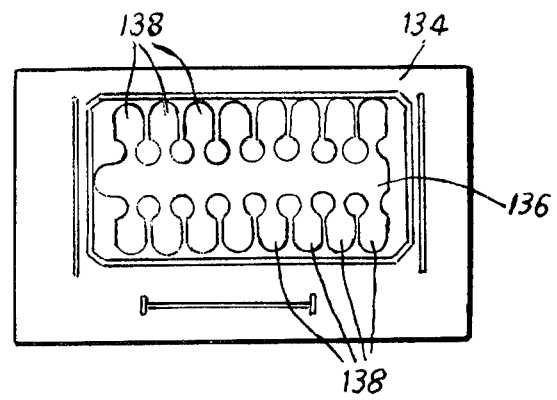

FIGS. 9 and 10 show the signature input device 30, which is used to apply a multi-bit digital signal (or "signature") representative of the stiffness and zero torque twist of its associated shaft.

As manufactured, the signature input device 30 will present a short-circuit link in each information position. Where open-circuits are required instead of links, these will normally be determined during the manufacture of the shaft and torque-tube assembly, and the information recorded on the engine log book or other suitable place.

The signature device 30 comprises an insulating base 130 to which are rigidly fitted seventeen plug pins, one of which, indicated at 132, is an input pin and the other sixteen of which are output pins 133.

A thin flexible printed circuit sheet 134 is connected to the pins 132 and 133, the sheet carrying a input conductive track 136 which is connected to the input pin 132 and a plurality of branch tracks 138 each connecting the track 136 to a respective one of the output pins 133. The face of the sheet 134 is overprinted to show a respective figure one over each branch track 138. The tracks 138 are broken as required by piercing the flexible sheet 134, through respective punch location holes 140 provided in the base 130 under each track 138, using a simple hand punching tool. The figure ones are removed during this operation, and the programmed signature thus shows as a binary code (with the punched holes representing zeroes). The pin 132 is offset, and thus ensures correct orientation of the signature device 30 in its socket 108 (FIG. 8). The face of the signature socket 108 is suitably marked to relate it to its appropriate engine, shown in FIG. 8 as port and starboard.

The pin/base/flexible p.c.b. assembly forming the device 30 is designed as a replaceable unit, and is accommodated within an aluminium outer cover 144 (FIG. 8) having windows 146 through which the aforementioned binary code can be viewed. The complete assembly of device 30 and cover 144 is attached to the electronic unit 20 by captive bolts 148. An R.F.I. gasket 150 is employed.

If desired, the punch location holes can be made blind and much smaller, and concentrically surrounded by a groove, so that the piercing operation becomes more a cutting operation effected by a rotary action of an annular tool designed to co operate with the groove.

Figure 11:
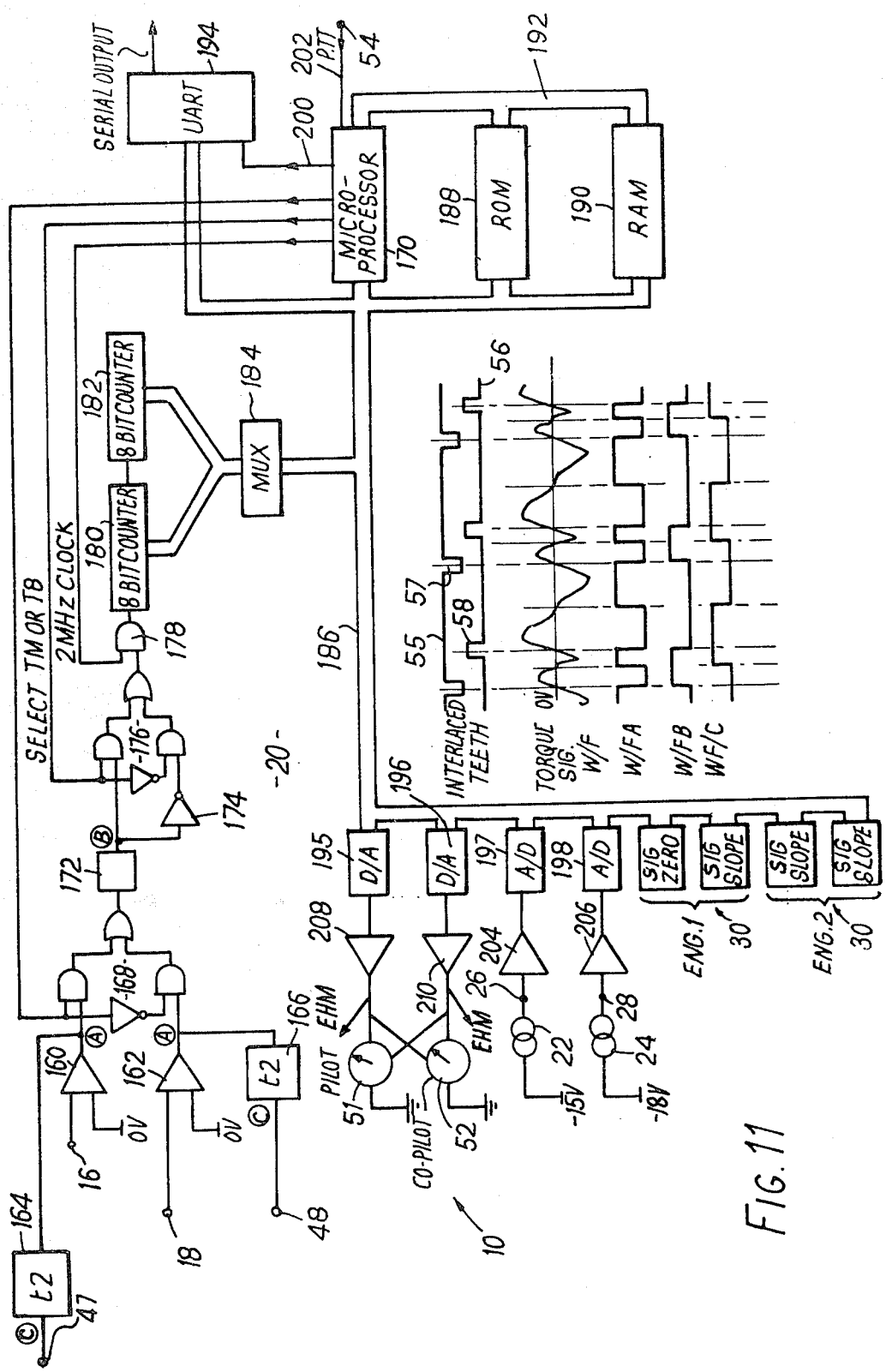
FIG. 11 is a more detailed block circuit diagram of the system of FIG. 1.

The circuitry of the torque measuring system 10 is shown in more detail in FIG. 11, from which it can be seen that the respective torque signals applied by the sensors 12 and 14 to the inputs 16, 18 of the electronic unit 20 are applied within the unit to respective comparators 160, 162. The comparators 160, 162 detect the zero crossings in the respective waveforms of the signals at the inputs 16, 18 (an example of such a waveform being also shown in FIG. 11), and effectively operate to square these signals to produce signals having a waveform indicated as waveform A in FIG. 11.

The signals at the outputs of the comparators 160, 162 are applied, via respective bistable circuits 164, 166 which operate as divide-by-two frequency dividers in response to the positive-going edges of waveform A, to the outputs 47, 48 respectively of the unit 20, where they serve as respective shaft speed signals (waveform C in FIG. 11) as mentioned earlier. The comparator output signals are also applied to a simple gating circuit 168, which operates under the control of a microprocessor 170 to select them in alternation for application to a bistable circuit 172. The bistable circuit 172 also operates as a divide-by-two frequency divider, but in response to the negative-going edges of waveform A, to produce a signal whose waveform is typically like that of waveform B in FIG. 11.

The negative-going edges of waveform A substantially coincide with the centres of adjacent ones of the teeth 57, 58 associated with the shaft currently selected for measurement by the microprocessor 170 via the gating circuit 168, so it will be appreciated that the mark-space ratio, $T_m:T_s$, of the signal at the output of the bistable circuit 172 (ie of waveform B) is representative of the torque applied to that shaft.

The signal at the output of the bistable circuit 172, and an inverted version of it produced by an inverter 174, are applied to another simple gating circuit 176, which also operates under the control of the microprocessor 170 to select them in alternation, this time for application to one input of a two-input AND gate 178. The other input of the AND gate 178 is connected to receive 2 MHz clock pulses from the microprocessor 170, while the output of the AND gate is connected to the count input of a sixteen-bit counter made up of two eight-bit counters 180, 182 connected in cascade. Thus the counters 180, 182 together count the clock pulses either during the mark periods $T_m$ or during the space periods $T_s$, as selected by the gating circuit 176.

The count outputs of the counters 180, 182 are connected via a multiplexer 184 to an eight bit data bus 186 which interconnects the microprocessor 170, a read-only memory (ROM) 188 containing the program for controlling the microprocessor, and a random access memory (RAM) 190 for storing data being processed by the microprocessor. The microprocessor 170, the ROM 188 and the RAM 190 are also interconnected by an address bus 192, while the data bus 186 is also connected to a UART 194, two digital-to-analog converters 195, 196, two analog-to-digital converters 197, 198 and the signature devices 30, 32 (each of which has its sixteen output pins 133 divided into two groups of eight). The microprocessor 170 controls the UART 194, which operates as a parallel-to-serial converter, via a control line 200, and controls the converters 195 to 198 and the devices 30, 32 via other control lines (not shown). Additionally, the microprocessor has an input 202 connected to receive the test command (PTT) signal when it is applied to the input 54 of the unit 20.

The analog-to-digital converters 197, 198 are arranged to received respective ones of the analog temperature signals produced by the temperature sensors 22 and 24 via the inputs 26, 28 of the unit 20 and respective current-to-voltage converters 204, 206 within the unit, and to covert these temperature signals into respective digital representations thereof for application to the data bus 186. The digital-to-analog converters 195 and 196 are arranged to convert respective torque signals, produced as will be described shortly, into corresponding analog torque signals which are applied via respective buffer amplifiers 208, 210 to the outputs 41 and 43 and 44 to 46 respectively, for use as described in relation to FIG. 1.

In operation, the microprocessor 170, under the control the program stored in the ROM 188, controls the gating circuits 168, 176 such that the counters 180, 182 sequentially accumulate first and second counts respectively representative of the total duration of M successive mark periods $T_m$ and M successive space periods $T_s$ of the squared torque signal derived from the first engine, followed by corresponding first and second counts for the second engine: typically, M may be 32. All four accumulated counts are read into selected address locations in the RAM 190 via the multiplexer 184, and the whole process is repeated continuously.

It will be appreciated that the accumulation of counts during M successive mark periods and M successive space periods is effectively an averaging process, which increases the accuracy and resolution of the measurement of the respective duration of the periods. To further increase accuracy and resolution, while enhancing noise rejection, the microprocessor 170 is programmed to perform a digital filtering operation on respective sets of the most recently accumulated first and second counts for each engine. The microprocessor 170 is in fact programmed to implement a recursive digital filter, having a response approximating a second order Butterworth filter, by combining each set of most recently accumulated counts, typically sixteen times per second, in accordance with the function.

$$R_{n+1}=R_n+a(S_{n+1}-R_{n-1})+b(R_n-R_{n-1}) \quad (1)$$

where $R_{n+1}$, $R_n$ and $R_{n-1}$ are the (n+1)th, the $n^{th}$ and the $(n-1)^{th}$ such combinations respectively, $S_{n+1}$ is the (n+1)th count, and a and b are constants.

Thus the microprocessor 170 produces 16 filtered measurements per second of each of $T_m$ and $T_s$ for each engine.

The filtered measurements for the first engine are then combined by the microprocessor 170 to determine the shaft torque in the first engine, in accordance with the formula $$\text{Torque} = \left[\left(\frac{T_s - T_m}{T_s + T_m}\right) + K_O\right] K_S K_T \quad (2)$$

where $K_O$ and $K_S$ are the zero twist and stiffness portions respectively of the digital signature obtained from the signature device 30 and $K_T$ is the digital temperature-representative signal from the converter 197. An exactly analogous operation is performed using the filtered measurements for the second engine, and the two digital torque originals thus obtained are applied to respective ones of the digital-to-analog converters 195, 196 to produce corresponding analog torque signals, as mentioned earlier.

A serial digital torque output signal can be obtained from the UART 194 if desired.

When the aforementioned "press-to-test" facility is operated, the resulting test command signal at the input 202 of the microprocessor 170 causes it to enter a test routine in which most of its major functions are checked. If these functions are operating correctly, the microprocessor 170 outputs respective digital torque signals chosen to drive each of the indicators 51, 52 to give a predetermined torque indication.

Many modifications can be made to the described embodiment of the invention. For example, two pairs of the counter 180, 182 can be employed, and arranged so that counts for $T_m$ and $T_s$ can be accumulated concurrently, instead of sequentially. Also, the microprocessor 170 can be arranged to implement a different kind of digital filter, and in particular a digital filter which repeatedly calculates the running average of the N most recent accumulated counts, where N may typically be 16.

We claim:

1. A digital torque measuring system comprising:
   sensor means adapted to be mounted adjacent a shaft whose torque is to be measured, the sensor means being arranged to produce a mark-space output signal whose mark-space ratio is a function of said torque;
   a source of clock pulses;
   counter means arranged to count said clock pulses during groups of M successive ones of at least one of the mark periods or the space periods of said output signal;
   recursive digital filter means connected to receive successive ones of the counts accumulated by the counter means, and responsive to each such count to combine at least that count with at least one previous output of the digital filter means in accordance with a predetermined function selected to produce a new output which is representative of the period represented by that count, but which has a resolution greater than that of that count; and
   calculator means arranged to receive each successive output from the digital filter means and to calculate said torque therefrom.

2. A system as claimed in claim 1, wherein said predetermined function is given by $$R_{n+1}=R_n+a(S_{n+1}-R_{n-1})+b(R_n-R_{n-1})$$

where $R_{n+1}$, $R_n$ and $R_{n-1}$ are the $(n+1)^{th}$, the $n^{th}$ and the $(n-1)^{th}$ such combinations respectively, $S_{n+1}$ is the $(n+1)^{th}$ count, and a and b are constants.

3. A system as claimed in claim 1, wherein said digital filter means and said calculator means together comprise microprocessor means.

4. A system as claimed in claim 1, wherein the counter means is arranged to count said clock pulses during groups of M successive mark periods to form accumulated mark-representative counts and during groups of M successive space periods to form accumulated space-representative counts, and wherein the microprocessor means is arranged to form said combinations both from the mark-representative counts and from the space-representative counts and to calculate said torque from each corresponding pair of such combinations.

5. A system as claimed in claim 4, wherein said counter means comprises a single counter arranged to accumulate said mark-representative counts and said space-representative counts in alternation.

6. A system as claimed in claim 1, further comprising a temperature sensing means for sensing the temperature of the shaft and for producing a digital signal representative thereof, the microprocessor means being responsive to the digital temperature-representative signal to correct said torque calculation in dependence upon shaft temperature.

7. A system as claimed in claim 1, further comprising a device for producing a selectable multi-bit digital signal representative of at least one of the stiffness and zero-torque twist of the shaft, the microprocessor means being arranged to use said multi-bit signal to effect said torque calculation.

8. A system as claimed in claim 7, wherein said device comprises:
an insulating support having an input pin for receiving an input signal of predetermined logic level, and a plurality of output pins for applying said digital signal to said microprocessor means, and
a relatively thin printed circuit mounted on a surface of said support, said printed circuit including a common track electrically connected to said input pin and a plurality of individual tracks each extending from said common track to a respective connection point electrically connected to a respective one of said output pins, the support being shaped beneath each of said individual tracks to facilitate severing of the respective track, whereby said input pin may be connected to any selected combination of said output pins to produce said digital signal.

9. A system as claimed in claim 8, wherein the support is provided with a respective hole, shaped to receive a punch tool, beneath each of said individual tracks.

10. A system as claimed in claim 8, wherein said device is in the form of a plug arranged to co-operate with a socket which is adapted to receive said pins and which is connected to said electronic circuit to receive said input signal therefrom and to apply said digital signal thereto.

* * * * *